(12) United States Patent
Goto

(10) Patent No.: US 12,516,159 B2
(45) Date of Patent: Jan. 6, 2026

(54) POLYETHER-MODIFIED SILOXANE, COATING ADDITIVE, COATING COMPOSITION, COATING AGENT, COATING LAYER, AND METHOD FOR PRODUCING POLYETHER-MODIFIED SILOXANE

(71) Applicant: SHIN-ETSU CHEMICAL CO., LTD., Tokyo (JP)

(72) Inventor: Tomoyuki Goto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 834 days.

(21) Appl. No.: 17/770,723

(22) PCT Filed: Sep. 30, 2020

(86) PCT No.: PCT/JP2020/037109
§ 371 (c)(1),
(2) Date: Apr. 21, 2022

(87) PCT Pub. No.: WO2021/095385
PCT Pub. Date: May 20, 2021

(65) Prior Publication Data
US 2022/0403117 A1    Dec. 22, 2022

(30) Foreign Application Priority Data

Nov. 15, 2019 (JP) ................. 2019-206973

(51) Int. Cl.
*C08G 77/46* (2006.01)
*C09D 7/65* (2018.01)

(52) U.S. Cl.
CPC ............... *C08G 77/46* (2013.01); *C09D 7/65* (2018.01)

(58) Field of Classification Search
CPC .... C08G 77/46; C08G 77/12; C08G 18/5096; C08G 18/61; C08G 18/6229; C08G 18/792; C08G 65/336; C09D 7/65; C09D 5/1637; C09D 133/066; C09D 171/02; C09D 175/08; C09D 183/12; C08L 83/04
See application file for complete search history.

(56) References Cited

U.S. PATENT DOCUMENTS

| | | | |
|---|---|---|---|
| 2010/0003211 A1 | 1/2010 | Sakamoto | |
| 2010/0184935 A1 | 7/2010 | Oberhellman et al. | |
| 2010/0330011 A1 | 12/2010 | Kennan et al. | |
| 2014/0134125 A1* | 5/2014 | Dahl | ............... C09K 23/54 514/777 |
| 2015/0353741 A1 | 12/2015 | Liao | |
| 2016/0083622 A1* | 3/2016 | Liao | ............... C09D 183/08 427/409 |
| 2016/0347910 A1 | 12/2016 | Sivasubramanian et al. | |
| 2017/0137574 A1 | 5/2017 | Akabane et al. | |
| 2018/0361719 A1* | 12/2018 | Kikuchi | ............... B32B 27/28 |
| 2020/0222302 A1 | 7/2020 | Bekemeier et al. | |
| 2021/0292560 A1 | 9/2021 | Takada et al. | |

FOREIGN PATENT DOCUMENTS

| | | |
|---|---|---|
| CN | 101389693 A | 3/2009 |
| CN | 109563346 A | 4/2019 |
| EP | 2 956 295 B1 | 6/2019 |
| JP | 2010-013591 A | 1/2010 |
| JP | 2010-532413 A | 10/2010 |
| JP | 2013-166830 A | 8/2013 |
| JP | 2016-053107 A | 4/2016 |
| JP | 2017-088808 A | 5/2017 |
| JP | 2018-070683 A | 5/2018 |
| JP | 2018-080275 A | 5/2018 |
| JP | 2018-535081 A | 11/2018 |
| WO | 2019/045831 A1 | 3/2019 |

OTHER PUBLICATIONS

Feb. 21, 2023 Office Action issued in Chinese Patent Application No. 202080078914.3.
May 26, 2023 Extended European Search Report issued in European Patent Application No. 20887555.9.
Dec. 8, 2020 International Search Report issued in International Patent Application No. PCT/JP2020/037109.
May 17, 2022 International Preliminary Report on Patentability issued in International Patent Application No. PCT/JP2020/037109.

* cited by examiner

*Primary Examiner* — Mark Eashoo
*Assistant Examiner* — Cullen L G Davidson
(74) *Attorney, Agent, or Firm* — Oliff PLC

(57) ABSTRACT

A polyether-modified siloxane represented by an average composition formula (1): $(R_3SiO_{1/2})_a(R_2R'SiO_{1/2})_{a'}(R_2SiO_{2/2})_b(RR'SiO_{2/2})_{b'}(RSiO_{3/2})_c(SiO_{4/2})_d$. In the formula (1), "R"s each represent a hydrogen atom, a hydroxy group, a monovalent hydrocarbon group having 1 to 18 carbon atoms, or an alkoxy group having 1 to 10 carbon atoms, "R'"s each represent an organic group selected from groups represented by $-C_qH_{2q}-O-(C_2H_4O)_e(C_3H_6O)_f-R^1$, $R^1$s each represent a hydrogen atom, a hydrocarbon group having 1 to 30 carbon atoms, or an organic group represented by $R^6-(CO)-$, and $R^6$ represents a hydrocarbon group having 1 to 30 carbon atoms. This can provide a novel polyether-modified siloxane that has little environmental impact and that provides excellent antifouling performance.

19 Claims, No Drawings

POLYETHER-MODIFIED SILOXANE, COATING ADDITIVE, COATING COMPOSITION, COATING AGENT, COATING LAYER, AND METHOD FOR PRODUCING POLYETHER-MODIFIED SILOXANE

TECHNICAL FIELD

The present invention relates to a novel polyether-modified siloxane (siloxane branched type polyether-modified silicone) and a coating additive containing the polyether-modified siloxane. In addition, the present invention relates to a coating composition, a coating agent, and a coating layer that contain the coating additive, and in further detail, relates to a coating composition, a coating agent, and a coating layer that have stain-proofing performance. Furthermore, the present invention relates to a method for producing a polyether-modified siloxane.

BACKGROUND ART

In recent years, coating with paints is applied for the purpose of stain-proofing in various uses including electric appliances, such as mobile phones, personal computers, televisions, and plasma displays, transport equipment, such as automobiles and trains, and extending to various daily necessities.

As a paint excellent in stain-proofing property, a composition containing an additive containing fluorine in molecules thereof is commonly known (Patent Document 1). However, since materials are expensive, and moreover, from a viewpoint of environmental problems, additives containing no fluorine are desired.

As a coating additive containing no fluorine, polyether-modified silicones are widely used for the purpose of achieving surface-leveling property, antifoaming property, etc. (Patent Document 2). However, no polyether-modified silicones are known that provide excellent stain-proofing performance.

CITATION LIST

Patent Literature

Patent Document 1: JP 2018-070683 A

Patent Document 2: JP 2013-166830 A

SUMMARY OF INVENTION

Technical Problem

The present invention has been made in view of such circumstances, and an object thereof is to provide a novel polyether-modified siloxane, coating additive, coating composition, coating agent, and coating layer that have little environmental impact and that provide excellent antifouling performance. Another object of the present invention is to provide a method for producing a novel polyether-modified siloxane that has little environmental impact and that provides excellent antifouling performance.

Solution to Problem

To achieve the object, the present invention provides a polyether-modified siloxane represented by an average composition formula (1):

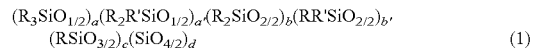

$$(R_3SiO_{1/2})_a(R_2R'SiO_{1/2})_{a'}(R_2SiO_{2/2})_b(RR'SiO_{2/2})_{b'}(RSiO_{3/2})_c(SiO_{4/2})_d \quad (1)$$

wherein in the formula (1), "R"s are each independent, are identical to or different from one another, and each represent a hydrogen atom, a hydroxy group, a monovalent hydrocarbon group having 1 to 18 carbon atoms, or an alkoxy group having 1 to 10 carbon atoms, "R'"s are each independent, are identical to or different from one another, and each represent an organic group selected from groups represented by —$C_qH_{2q}$—O—$(C_2H_4O)_e(C_3H_6O)_f$—$R^1$, $R^1$s are each independent, are identical to or different from one another, and each represent a hydrogen atom, a hydrocarbon group having 1 to 30 carbon atoms, or an organic group represented by $R^6$—(CO)—, $R^6$ represents a hydrocarbon group having 1 to 30 carbon atoms, "a", "a'", "b", "b'", "c", and "d" respectively satisfy 0≤a≤15, 0≤a'≤15, 5≤b≤1000, 0≤b'≤50, 1≤c≤10, 0≤d≤5, and 2≤a'+b'≤50, "e" and "f" respectively satisfy 2≤e≤200 and 0≤f≤200, "q" satisfies 2≤q≤10, and 2≤e+f≤200.

Such a polyether-modified siloxane has little environmental impact, and can provide excellent antifouling performance.

The "R"s in the formula (1) preferably do not contain a methoxy group or an ethoxy group.

Such a polyether-modified siloxane can provide more excellent stability over time.

Preferably, d=0 in the formula (1).

Such a polyether-modified siloxane can provide excellent compatibility when a coating composition is formed.

The polyether-modified siloxane preferably has a dispersity (Mw/Mn) of 1.70 to 2.70 in a gel permeation chromatography measurement in terms of polystyrene.

Such a polyether-modified siloxane can provide more excellent antifouling performance. In addition, such a polyether-modified siloxane has favorable compatibility and can exhibit high ease in synthesis.

Furthermore, the present invention provides a coating additive comprising the above-described polyether-modified siloxane.

Such a coating additive has little environmental impact, and can provide excellent antifouling performance.

Furthermore, the present invention provides a coating composition comprising the above-described coating additive.

Such a coating composition contains a coating additive that has little environmental impact and can provide excellent antifouling performance.

Furthermore the inventive coating composition preferably comprises a resin selected from the group consisting of urethane resin, acrylic resin, amide resin, phenolic resin, epoxy resin, melamine resin, urea resin, alkyd resin, polyimide resin, polyalkylene resin, polyvinyl chloride, polystyrene, polyvinyl acetate, and an alloy of the resins.

Various resins are applicable to the inventive coating composition as described.

In this event, the resin is preferably urethane resin, acrylic resin, or epoxy resin.

These resins are preferable since they have good compatibility with a coating additive containing the above-described polyether-modified siloxane.

The inventive coating composition is preferably for an antifouling coating.

The inventive coating composition can exhibit excellent antifouling property without degrading various coating performances such as antifoaming property and leveling property.

Furthermore, the present invention provides a coating agent comprising the above-described coating composition.

The inventive coating agent can exhibit excellent antifouling property without degrading various coating performances such as antifoaming property and leveling property.

Furthermore, the present invention provides a coating layer formed from the above-described coating agent.

The inventive coating layer can be applied to various substrates, and can exhibit excellent antifouling property.

Furthermore, the present invention provides a method for producing a polyether-modified siloxane represented by an average composition formula (1):

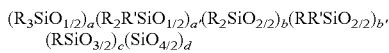
$(R_3SiO_{1/2})_a(R_2R'SiO_{1/2})_{a'}(R_2SiO_{2/2})_b(RR'SiO_{2/2})_{b'}$
$(RSiO_{3/2})_c(SiO_{4/2})_d$ wherein in the formula (1), "R", "R'", "a", "a'", "b", "b'", "c", and "d" are as described above, the method comprising the following steps (I) and (II).

Step (I) is a step of using:

a compound represented by an average composition formula (2): $(R''_3SiO_{1/2})_g(R''_2SiO_{2/2})_h(R''SiO_{3/2})_i(SiO_{4/2})_j$ and a compound represented by an average composition formula (3): $(R''_2SiO_{2/2})_k(R''HSiO_{2/2})_l$ and/or a compound represented by an average composition formula: (4): $(R''_3SiO_{1/2})_m(R''_2HSiO_{1/2})_n(R''_2SiO_{2/2})_o(R''HSiO_{2/2})_p$, wherein in the formula (2), "R'''"s are each independent, are identical to or different from one another, and each represent a hydroxy group or a monovalent hydrocarbon group having 1 to 18 carbon atoms, 0≤g≤10, 0≤h≤100, 1≤i≤30, and 0≤j≤8, and wherein in the formulae (3) and (4), "R'''"s are as described above, and 0≤k≤6, 0≤l≤6, 0≤m≤2, 0≤n≤2, 0≤o≤500, 0≤p≤100, 3≤k+l≤8, n+m=2, and 0≤o+p≤500 to synthesize a compound represented by an average composition formula:

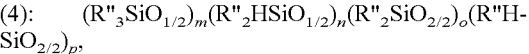
$(R''_3SiO_{1/2})_a(R''_2HSiO_{1/2})_{a'}(R''_2SiO_{2/2})_b(R''HSiO_{2/2})_{b'}$
$(R''SiO_{3/2})_c(SiO_{4/2})_d$ wherein in the formula (5), "R'''", "a", "a'", "b", "b'", "c", and "d" are as described above, and step (II) is a step of causing a reaction between the compound of the formula (5) and a compound represented by an average composition formula (6):

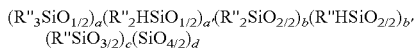
$CH_2=CX-C_rH_{2r}-O-(C_2H_4O)_e(C_3H_6O)_f-R^1$ wherein in the formula (6), $R^1$, "e", and "f" are as described above, X represents a hydrogen atom or a monovalent hydrocarbon group having 1 to 5 carbon atoms, and 0≤r≤8.

According to such a method for producing a polyether-modified siloxane, it is possible to produce a polyether-modified siloxane that has little environmental impact and that can provide excellent antifouling performance.

In the step (II) of the inventive method for producing a polyether-modified siloxane, a ratio of the compound represented by the formula (6) to the compound represented by the formula (5), the ratio being [number of moles of alkenyl groups in a component of the formula (6)]/[number of moles of Si—H groups in a component of the formula (5)], is preferably 1.00 to 2.00.

According to such a production method, it is possible to produce easily the inventive polyether-modified siloxane, in which an addition reaction proceeds readily, has little environmental impact, and provides excellent antifouling performance. In addition, since a large amount of SiH does not remain, there is no concern for the generation of a large quantity of hydrogen gas over time.

Advantageous Effects of Invention

The inventive polyether-modified siloxane has little environmental impact and can provide excellent antifouling performance. In addition, a coating additive containing the inventive polyether-modified siloxane is useful as a coating composition and a coating agent. Furthermore, a coating layer formed from the inventive coating additive has little environmental impact and can exhibit excellent antifouling performance. Moreover, according to the inventive method for producing a polyether-modified siloxane, a polyether-modified siloxane that has little environmental impact and that can provide excellent antifouling performance can be produced easily.

DESCRIPTION OF EMBODIMENTS

As described above, there have been demands for the development of a coating additive and a coating composition that have little environmental impact and that provide excellent antifouling performance.

To achieve the above-described object, the present inventor has earnestly studied and found out that a newly synthesized polyether-modified siloxane having a specific structure provides paints with excellent antifouling performance, and completed the present invention.

That is, the present invention is a polyether-modified siloxane represented by an average composition formula (1):

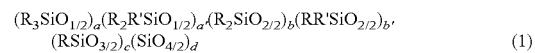
$(R_3SiO_{1/2})_a(R_2R'SiO_{1/2})_{a'}(R_2SiO_{2/2})_b(RR'SiO_{2/2})_{b'}$
$(RSiO_{3/2})_c(SiO_{4/2})_d$ (1)

wherein in the formula (1), "R"s are each independent, are identical to or different from one another, and each represent a hydrogen atom, a hydroxy group, a monovalent hydrocarbon group having 1 to 18 carbon atoms, or an alkoxy group having 1 to 10 carbon atoms, "R'"s are each independent, are identical to or different from one another, and each represent an organic group selected from groups represented by $-C_qH_{2q}-O-(C_2H_4O)_e(C_3H_6O)_f-R$, $R^1$s are each independent, are identical to or different from one another, and each represent a hydrogen atom, a hydrocarbon group having 1 to 30 carbon atoms, or an organic group represented by $R^6-(CO)-$, $R^6$ represents a hydrocarbon group having 1 to 30 carbon atoms, "a", "a'", "b", "b'", "c", and "d" respectively satisfy 0≤a≤15, 0≤a'≤15, 5≤b≤1000, 0≤b'≤50, 1≤c≤10, 0≤d≤5, and 2≤a'+b'≤50, "e" and "f" respectively satisfy 2≤e≤200 and 0≤f≤200, "q" satisfies 2≤q≤10, and 2≤e+f≤200.

Hereinafter, the present invention will be described in further detail, but the present invention is not limited thereto.

<Polyether-Modified Siloxane>

The inventive polyether-modified siloxane (siloxane-branched type polyether-modified silicone) is represented by an average composition formula (1): 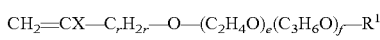 $(R_3SiO_{1/2})_a(R_2R'SiO_{1/2})_{a'}(R_2SiO_{2/2})_b(RR'SiO_{2/2})_{b'}(RSiO_{3/2})_c(SiO_{4/2})_d$.

In the formula (1), "R"s are each independent, may be identical to or different from one another, and each represent a hydrogen atom, a hydroxy group, a monovalent hydrocarbon group having 1 to 18 carbon atoms, or an alkoxy group having 1 to 10 carbon atoms. Examples of the monovalent hydrocarbon group having 1 to 18 carbon atoms include alkyl groups, aryl groups, and aralkyl groups. Preferable examples include alkyl groups, aryl groups, and aralkyl groups each of which has 1 to 12 carbon atoms, and particularly preferable examples include a methyl group, an ethyl group, a propyl group, a hexyl group, an octyl group, a dodecyl group, and a phenyl group. A methyl group, an ethyl group or a phenyl group is the most preferable. Examples of the alkoxy group having 1 to 10 carbon atoms include linear, branched, or cyclic aliphatic alkoxy groups and substituted or unsubstituted aromatic alkoxy groups (aryloxy groups), and a propoxy group and an isopropoxy group are preferable. In particular, from the aspect of stability over time, methoxy groups and ethoxy groups are preferably not contained. That is, it is particularly preferably for the "R"s in the formula (1) not to contain a methoxy group or an ethoxy group. Furthermore, out of all the "R"s in the formula (1), 98% or more are preferably each a monovalent hydrocarbon group having 1 to 18 carbon atoms, particularly preferably, 99% or more are each a monovalent hydrocarbon group having 1 to 18 carbon atoms, and most preferably, 99.5% or more are each a monovalent hydrocarbon group having 1 to 18 carbon atoms.

In the formula (1), "R'"s are each independent, may be identical to or different from one another, and each represent an organic group selected from groups represented by $-C_qH_{2q}-O-(C_2H_4O)_e(C_3H_6O)_f-R^1$. $R^1$s are each independent, may be identical to or different from one another, and each represent a hydrogen atom, a hydrocarbon group having 1 to 30 carbon atoms, or an organic group represented by $R^6-(CO)-$. As the hydrocarbon group having 1 to 30 carbon atoms, a hydrocarbon group having 1 to 10 carbon atoms is preferable in view of availability. $R^6$ is preferably a hydrocarbon group having 1 to 10 carbon atoms in view of availability. "e", "f", and "q" respectively satisfy $2 \le e \le 200$, $0 \le f \le 200$, $2 \le q \le 10$, and $2 \le e+f \le 200$. In view of availability, "e", "f", and "q" preferably satisfy respectively $2 \le e \le 50$, $0 \le f \le 50$, and $2 \le q \le 5$, "e" and "f" are preferably integers that satisfy $3 \le e+f \le 100$, and preferably, $e > f$. If $e+f$ is less than 2, antifouling property is degraded. Meanwhile, if $e+f$ is greater than 200, synthesis is difficult. When $e > f$ more excellent antifouling property can be exhibited. Note that when an R' group contains both an ethyleneoxide unit and a propyleneoxide unit, these two units may constitute a block polymer or may constitute a random polymer.

"a", "a'", "b", "b'", "c", and "d" respectively satisfy $0 \le a \le 15$, $0 \le a' \le 15$, $5 \le b \le 1000$, $0 \le b' \le 50$, $1 \le c \le 10$, $0 \le d \le 5$, and $2 \le a'+b' \le 50$. If "a", "a'", "b", and "b'" deviate from the above ranges, properties (antifouling property, compatibility, antifoaming property, and leveling property) become unstable when a coating composition is formed. If "c" exceeds 10, antifoaming property is degraded, and if less than 1, antifouling property is degraded. If "d" becomes greater than the above range, compatibility when a coating composition is formed is degraded. Preferably, $1 \le c \le 8$ and $d=0$, particularly preferably, $1 \le c \le 6$.

The polyether-modified siloxane (siloxane-branched type polyether-modified silicone) represented by the formula (1) preferably has a dispersity (Mw/Mn) of 1.70 to 2.70, particularly preferably 1.80 to 2.60, and further preferably 1.85 to 2.50 in a gel permeation chromatography measurement in terms of polystyrene. When the dispersity is 1.70 to 2.70, more excellent antifouling property can be provided. Moreover, a polyether-modified siloxane having a dispersity of 1.70 to 2.70 can exhibit high ease in synthesis.

Furthermore, the polyether-modified siloxane (siloxane-branched type polyether-modified silicone) represented by the formula (1) has a weight-average molecular weight of 1000 to 100,000, preferably 2,000 to 80,000, and particularly preferably 4,000 to 40,000 in GPC in terms of polystyrene. A polyether-modified siloxane having a weight-average molecular weight of 1000 to 100,000 can provide more excellent antifouling property. Moreover, a polyether-modified siloxane having a weight-average molecular weight of 1000 to 100,000 can exhibit a viscosity suitable for handling, and can prevent problems of compatibility with resins.

The above-described polyether-modified siloxane has little environmental impact, and can provide excellent antifouling performance.

<Method for Producing Polyether-Modified Siloxane>

In addition, the present invention relates to a method for producing the polyether-modified siloxane (siloxane-branched type polyether-modified silicone) represented by the formula (1).

The method for producing the polyether-modified siloxane of the formula (1) includes the following steps (I) and (II).

Step (I) is a step of using a compound represented by an average composition formula (2): $(R''_3SiO_{1/2})_g(R''_2SiO_{2/2})_h(R''SiO_{3/2})_i(SiO_{4/2})_j$ (in the formula (2), "R''"s are each independent, are identical to or different from one another, and each represent a hydroxy group or a monovalent hydrocarbon group having 1 to 18 carbon atoms, $0 \le g \le 10$, $0 \le h \le 100$, $1 \le i \le 30$, and $0 \le j \le 8$);

and a compound represented by an average composition formula (3): $(R''_2SiO_{2/2})_k(R''HSiO_{2/2})_l$; and/or a compound represented by an average composition formula (4): $(R''_3SiO_{1/2})_m(R''_2HSiO_{1/2})_n(R''_2SiO_{2/2})_o(R''HSiO_{2/2})_p$ (4) (in the formulae (3) and (4), "R''"s are as described above, and $0 \le k \le 6$, $0 \le l \le 6$, $0 \le m \le 2$, $0 \le n \le 2$, $0 \le o \le 500$, $0 \le p \le 100$, $3 \le k+l \le 8$, $n+m=2$, and $0 \le o+p \le 500$)

to synthesize a compound represented by an average composition formula (5): $(R''_3SiO_{1/2})_a(R''_2HSiO_{1/2})_{a'}(R''_2SiO_{2/2})_b(R''HSiO_{2/2})_{b'}(R''SiO_{3/2})_c(SiO_{4/2})_d$ (in the formula (5), "R''", "a", "a'", "b", "b'", "c", and "d" are as described above), and step (II) is a step of causing a reaction between the compound of the formula (5) and a compound represented by an average composition formula (6): $CH_2=CX-C_rH_{2r}-O-(C_2H_4O)_e(C_3H_6O)_f-R^1$ (in the formula (6), $R^1$, "e", and "f" are as described above, X represents a hydrogen atom or a monovalent hydrocarbon group having 1 to 5 carbon atoms, and $0 \le r \le 8$).

In the formulae (2) to (5), "R''"s are each independent, may be identical to or different from one another, and each represent a hydroxy group or a monovalent hydrocarbon group having 1 to 18 carbon atoms. Preferably, the "R''"s each represent an alkyl group, aryl group, or aralkyl group each of which has 1 to 12 carbon atoms, particularly preferably a methyl group, an ethyl group, a propyl group, a hexyl group, an octyl group, a dodecyl group, or a phenyl group, and most preferably a methyl group, an ethyl group, or a phenyl group.

"g", "h", "i", "j", "k", "l", "m", "n", "o", and "p" respectively satisfy $0 \le g$ 10, $0 \le h \le 100$, $1 \le i \le 30$, $0 \le j \le 8$, $0 \leq k \leq 6$, $0 \leq l \leq 6$, $0 \leq m \leq 2$, $0 \leq n \leq 2$, $0 \leq o \leq 500$, $0 \leq p \leq 100$, $3 \leq k+l \leq 8$, $n+m=2$, and $0 \leq o+p \leq 500$.

X represents a hydrogen atom or a monovalent hydrocarbon group having 1 to 5 carbon atoms, and $0 \leq r \leq 8$. In view of availability, X is preferably a hydrogen atom or a methyl group, and "r" preferably satisfies $0 \leq r \leq 2$.

"R''" "a", "a'", "b", "b'", "c", and "d" are as described above.

The compound represented by the formula (2) can be called, for example, an organopolysiloxane. Meanwhile, the compound represented by the formula (3) can be called, for example, a cyclic organopolysiloxane. In addition, the compound represented by the formula (4) can be called, for example, a linear organopolysiloxane.

Step (I) is, for example, a ring-opening and equilibration reaction between the organopolysiloxane represented by the formula (2) and the cyclic organopolysiloxane represented by the formula (3) and/or the linear organopolysiloxane represented by the formula (4) in the presence of an acid catalyst. Examples of the catalyst include methanesulfonic acid, trifluoromethanesulfonic acid, sulfuric acid, hydrochloric acid, etc., and among these, trifluoromethanesulfonic acid is particularly preferable.

In step (I), the organopolysiloxane represented by the formula (2) and the cyclic organopolysiloxane represented by the formula (3) and/or the linear organopolysiloxane represented by the formula (4) are preferably used so that the ratio [the mass of the compound represented by the formula (2)]/[the sum of the mass of the compound represented by the formula (3) and the mass of the compound represented by the formula (4)] is from 0.01 to 1.00. A more preferable ratio is from 0.02 to 0.50. When the components are contained within such ranges, the target structure is easier to obtain.

The amount of the catalyst can be a catalytic amount. For example, when trifluoromethanesulfonic acid is used, the catalytic amount is preferably 50 to 10000 ppm, particularly preferably 100 to 5000 ppm, and most preferably 200 to 2000 ppm relative to the total mass of the compounds of the formula (2), formula (3), and formula (4). When the catalytic amount is within the preferable ranges, sufficient reaction speed can be realized, and in addition, the removal of the catalyst can be prevented from becoming complicated.

The reaction temperature in step (I) is not particularly limited, but is preferably 0 to 100° C., further preferably 20 to 50° C. When the reaction temperature of step (I) is 0 to 100° C., sufficient reaction speed can be achieved while preventing the volatilization of the raw materials.

Step (I) can be performed in a system without a solvent or with a solvent. Specific examples of the solvent to be used include alkanes such as pentane, hexane, cyclopentane, cyclohexane, methylcyclohexane, and ethylcyclohexane, aromatic compounds such as benzene, toluene, xylene, and ethylbenzene, ethers such as diethyl ether, ethylpropyl ether, glyme, and diglyme, etc.

The compound represented by the formula (5) obtained in step (I) can be called, for example, an organohydrogensiloxane or an organohydrogenpolysiloxane. Meanwhile, the compound represented by the formula (6) used in step (II) can be called, for example, an alkenyl group-containing polyether or a polyoxyalkylene compound.

Step (II) is, for example, an addition reaction between the organohydrogenpolysiloxane represented by the formula (5) and the alkenyl group-containing polyether represented by the formula (6), and is performed in the presence of an addition reaction catalyst. As the addition reaction catalyst, a catalyst that is generally used in an addition reaction can be used. For example, a noble metal catalyst such as a platinum group metal-based compound can be used, and examples thereof include platinum-based, palladium-based, rhodium-based, and ruthenium-based catalysts and so forth. Among these, a platinum-based catalyst is preferably used. Furthermore, as the platinum-based catalyst, chloroplatinic acid, an alcohol solution or aldehyde solution of chloroplatinic acid, a complex of chloroplatinic acid with various olefins or vinylsiloxanes, etc. may be used, for example. In particular, a solution of complex catalyst (Karstedt's catalyst) of a chloroplatinic acid neutralized by sodium hydrogen carbonate-vinylsiloxane can be used suitably.

In step (II), the ratio of the alkenyl group-containing polyether represented by the formula (6) to the organohydrogenpolysiloxane represented by the formula (5), the ratio being [number of moles of alkenyl groups in a component of the formula (6)]/[number of moles of Si—H groups in a component of the formula (5)], is preferably 1.00 to 2.00, more preferably 1.05 to 1.50, and even more preferably 1.02 to 1.10.

The amount of the addition reaction catalyst can be a catalytic amount. In particular, the amount is preferably 0.1 to 100 ppm, particularly preferably 0.5 to 50 ppm, and most preferably 1 to 20 ppm in terms of metal relative to the total amount of the compound of the formula (5) and the compound of the formula (6). When the addition reaction catalyst is used in an amount within the preferable ranges, sufficient reaction speed can be achieved while suppressing a side reaction.

The reaction temperature in step (II) is not particularly limited, but is preferably 0 to 150° C., further preferably 20 to 100° C. When the reaction temperature of step (II) is 0 to 150° C., sufficient reaction speed can be achieved while preventing a side reaction.

In step (II), a reaction solvent may be used according to necessity. Examples of the solvent include aromatic hydrocarbon solvents such as toluene and xylene; aliphatic hydrocarbon solvents such as hexane, methylcyclohexane, and ethylcyclohexane; ether-based solvents such as dioxane, dibutyl ether, and dimethoxyethane; ester-based solvents such as ethyl acetate and butyl acetate; nitrile-based solvents such as acetonitrile and benzonitrile; alcohol-based solvents such as ethanol, propanol, isopropyl alcohol, and butanol; and the like. In particular, from the view point of compatibility with a reaction substrate, isopropyl alcohol and toluene are preferable. Solvents other than primary alcohols such as ethanol, propyl alcohol, and butanol are preferable since a dehydrogenation reaction between hydroxy groups and SiH groups can be prevented.

According to the above-described method for producing a polyether-modified siloxane, it is possible to produce the polyether-modified siloxane that has little environmental impact and can provide excellent antifouling performance described above.

<Coating Additive>

Furthermore, the present invention relates to a coating additive containing the polyether-modified siloxane (siloxane-branched type polyether-modified silicone) represented by the formula (1).

The inventive coating additive may consist of the above-described polyether-modified siloxane alone, or may further contain a solvent in addition to the polyether-modified siloxane. When a solvent is contained, homogenization by stirring is easier when the inventive coating additive is added to a coating composition. In addition, other components may be contained as necessary.

As solvents that can be blended in the inventive coating additive, those described in the description of the coating composition below can be used, for example, and propylene glycol monomethyl ether acetate and butyl acetate are preferable. In addition, when a solvent is contained, the inventive coating additive can be, for example, a 10 to 90% solution, preferably a 10 to 50% solution, further preferably a 15 to 30% solution of the above-described polyether-modified siloxane.

The inventive coating additive contains the above-described polyether-modified siloxane, and therefore, has little environmental impact and can provide excellent antifouling performance.

<Coating Composition>

Furthermore, the present invention relates to a coating composition containing the above-described coating additive, in particular, a coating composition for an antifouling coating.

The added amount of the polyether-modified siloxane is, for example, 0.01 to 10 parts by mass, preferably 0.1 to 5 parts by mass in 100 parts by mass of the coating composition. When the added amount of the polyether-modified siloxane is 0.01 to 10 parts by mass, sufficient stain-proofing property (antifouling property) can be exhibited while suppressing cost.

The coating composition preferably contains a resin. The resin is not particularly limited, but is preferably selected from the group consisting of urethane resin, acrylic resin, amide resin, phenolic resin, epoxy resin, melamine resin, urea resin, alkyd resin, polyimide resin, polyalkylene resin, polyvinyl chloride, polystyrene, polyvinyl acetate, and an alloy of the resins. In view of compatibility, urethane resin, acrylic resin, or epoxy resin is preferable. As described, various resins can be applied to the inventive coating composition. An alloy of resins is a polymer given a new property by mixing a plurality of polymers. An alloy of resins can also be called a polymer alloy.

The added amount of the resin is, for example, 10 to 99.5 parts by mass, preferably 30 to 90 parts by mass in 100 parts by mass of the coating composition. A coating composition having a resin content of 10 parts by mass or more can provide a coating layer (coating film) having sufficient mechanical strength.

In addition, other components well known in the industry may be appropriately blended in the inventive coating composition as necessary, for example, a curing agent, a diluent, a UV-absorber, a polymerization initiator, a polymerization inhibitor, a neutralizer, a stabilizer (a light stabilizer, a weathering stabilizer, and a heat stabilizer), an antioxidant, a levelling agent, a defoaming agent, a viscosity modifier, an anti-settling agent, a pigment, a dye, a dispersant, an antistatic agent, an anti-fogging agent, and rubbers.

As the curing agent, a polyfunctional compound is useful, and examples thereof include aliphatic polyisocyanate (hexamethylene diisocyanate trimer) (manufactured by Covestro, DESMODUR N 3390 BA/SN), etc. The amount of the curing agent is not particularly limited, but is, for example, 1 to 30 parts by mass, preferably 3 to 15 parts by mass in 100 parts by mass of the coating composition.

Examples of the diluent include esters, aliphatic hydrocarbons, aromatic hydrocarbons, ketones, alcohols, etc., and in particular, propylene glycol monomethyl ether acetate, butyl acetate, methyl ethyl ketone, methyl isobutyl ketone, toluene, and xylene are preferable. The amount of the diluent is not particularly limited, and is, for example, 10 to 90 parts by mass, preferably 20 to 70 parts by mass in 100 parts by mass of the coating composition.

The viscosity (25° C., B-type viscometer) of the inventive coating composition is, for example, 1 to 10000 mPa·s, preferably 10 to 5000 mPa·s, considering applicability, film thickness, etc.

The inventive coating composition contains the above-described coating additive, and therefore, has little environmental impact and can provide excellent antifouling performance. Accordingly, the inventive coating composition is particularly useful for an antifouling coating. Furthermore, the inventive coating composition can exhibit excellent antifouling property without losing various coating properties such as antifoaming property and leveling property.

<Coating Agent>

Additionally, the present invention relates to a coating agent using the above-described coating composition.

The inventive coating agent may consist of the above-described coating composition alone, or may further contain a solvent in addition to the coating composition. That is, the inventive coating agent contains the above-described coating composition. As the solvent to be contained in the inventive coating agent, a diluent given in the description of the coating composition can be used, for example.

The inventive coating agent contains the above-described coating composition, and therefore, has little environmental impact and can realize a coating layer that exhibits excellent antifouling performance. Furthermore, the inventive coating agent can exhibit excellent antifouling property without losing various coating properties such as antifoaming property and leveling property.

<Coating Layer>

Furthermore, the present invention relates to a coating layer that is formed from the above-described coating agent.

As a method for applying the coating agent to obtain the inventive coating layer, various methods employed for common paints can be used. That is, examples include spray coating, spin coating, roll coating, curtain coating, brushing, electrostatic application, anion/cation electrodeposition application, dipping, etc. In addition, a method for curing after the application is not particularly limited, but in particular, examples include (heat-)curing at 0 to 200° C., more preferably at 40 to 180° C.

Meanwhile, examples of a substrate (object to be coated) to which the coating layer can be applied include plastics such as polystyrene resin, acrylic resin, acrylonitrile-styrene-butadiene resin (ABS), polypropylene, ethylene-propylene resin, polycarbonate resin, NORYL resin, nylon resin, polyester resin, and blended products (alloys) of these and polyolefin, a reinforcing agent such as a filler, glass, or carbon fiber; thermosetting resins such as epoxy resin, unsaturated polyester resin, and urethane resin; inorganic materials such as glass, mortar, asbestos cement slate, and rock; metals such as iron (and alloys), copper (and alloys), aluminum (and alloys), and magnesium (and alloys); inflammables such as paper and vinyl fabric; etc.

As described, the inventive coating layer can be applied to various substrates. In addition, the inventive coating layer is formed from the above-described coating agent, and can therefore exhibit excellent antifouling property.

EXAMPLE

Hereinafter, the present invention will be described specifically with reference to Examples and Comparative Examples, but the present invention is not limited thereto.

[Weight-Average Molecular Weight (Mw) and Dispersity (Mw/Mn)]

The weight-average molecular weight (Mw) and dispersity (Mw/Mn) of the inventive polyether-modified siloxane can be determined by employing gel permeation chromatography (GPC) measurement in terms of polystyrene. Mn indicates number-average molecular weight. In the following Examples, the weight-average molecular weight and dispersity of each compound was measured under the following conditions.

Name of apparatus: HLC-8320GPC (manufactured by TOSOH Corporation)
Developing solvent: THF (tetrahydrofuran)
Column: the following columns were connected in series for use.
TSKgel Guardcolumn SuperH-H (manufactured by TOSOH Corporation)
TSKgel SuperHM-N (manufactured by TOSOH Corporation)
TSKgel SuperH2500 (manufactured by TOSOH Corporation)
TSKgel SuperH-RC (manufactured by TOSOH Corporation)
Column temperature: 40° C.
Flow rate: 0.6 mL/min
Detector: RI (accompanying HLC-8320)
Charge concentration: 0.3%
Charge amount: 50 μL
Calibration curve: polystyrene standard (PStQuick Kit-L, TSKstandard F-288)

[Structure Analysis]

The structure of the inventive polyether-modified siloxane can be determined by $^1$H NMR measurement and $^{29}$Si NMR measurement. In the following Examples, the structure of each compound was identified under the following conditions.

Name of apparatus: ECX5000II (manufactured by JEOL Ltd.)
Measuring solvent: CDCL3 (chloroform)

Example 1

A reactor was charged with 311 g of tris(trimethylsiloxy)methylsilane (compound (2-1)), 4190 g of 1,1,3,3,5,5,7,7-octamethylcyclotetrasiloxane (compound (3-1)), and 331 g of 1,3,5,7-tetramethylcyclotetrasiloxane (compound (3-2)). Then, 3.86 g of trifluoromethanesulfonic acid was added, and a reaction was allowed to proceed at 50° C. for 8 hours. After the reaction, the temperature of the liquid was lowered to 40° C., 23.2 g of KYOWAAD SH-500 (manufactured by Kyowa Chemical Industry Co., Ltd., hydrotalcite) was added and stirred for 1 hour, and the solid contents were removed by filtration. Further after that, low-boiling components were removed over 5 hours at 150° C./2 torr while bubbling nitrogen. Thus, an organohydrogensiloxane represented by the following average composition formula (5-1) was synthesized with a yield of 87% (step (I)).

Next, 97.1 g of the organohydrogensiloxane represented by the average composition formula (5-1) obtained in step (I), 79.7 g of the polyoxyalkylene compound of the following average composition formula (6-1), and 79.7 g of isopropyl alcohol were mixed in a reactor. 0.03 g of a 3 mass % solution of chloroplatinic acid in isopropyl alcohol was added to the obtained mixture, and this was made to react at 80° C. for 3 hours (step (II)).

$((CH_3)_3SiO_{1/2})_3((CH_3)_2SiO_{2/2})_{55.5}((CH_3)HSiO_{2/2})_{5.5}((CH_3)SiO_{3/2})_1$    average composition formula (5-1)

$CH_2=CHCH_2O(C_2H_4O)_{12.5}H$    Average composition formula (6-1)

After the completion of the reaction, the solvent was distilled off from the obtained solution at 120° C./2 torr over 2 hours. Then, a compound of an organopolysiloxane (polyether-modified siloxane) (A) represented by the following average composition formula was obtained with a yield of 95%.

$((CH_3)_3SiO_{1/2})_3((CH_3)_2SiO_{2/2})_{55.5}((CH_3)R^aSiO_{2/2})_{5.5}((CH_3)SiO_{3/2})_1$    compound (A)

$R^a=-C_3H_6O(C_2H_4O)_{12.5}H$

When the compound (A) was analyzed by GPC, the weight-average molecular weight Mw was 14,900, and the dispersity (Mw/Mn) was 1.97.

Example 2

In step (I), an organohydrogensiloxane represented by an average composition formula (5-2) was synthesized with a yield of 87% in the same manner as Example 1 except that 163 g of compound (2-1), 4320 g of compound (3-1), and 350 g of compound (3-2) were used.

Next, in step (II), 195 g of the organohydrogensiloxane represented by the average composition formula (5-2) obtained in step (I), 169 g of the polyoxyalkylene compound of the average composition formula (6-1), and 169 g of isopropyl alcohol were mixed in a reactor. 0.06 g of a 3 mass % solution of chloroplatinic acid in isopropyl alcohol was added to the obtained mixture, and this was made to react at 80° C. for 4 hours.

$((CH_3)_3SiO_{1/2})_3((CH_3)_2SiO_{2/2})_{109}((CH_3)HSiO_{2/2})_{10}((CH_3)SiO_{3/2})_1$    average composition formula (5-2)

After the completion of the reaction, the solvent was distilled off by heating the obtained solution under reduced pressure. Then, a compound of an organopolysiloxane (polyether-modified siloxane) (B) represented by the following average composition formula was obtained with a yield of 96%.

$((CH_3)_3SiO_{1/2})_3((CH_3)_2SiO_{2/2})_{109}((CH_3)R^aSiO_{2/2})_{10}((CH_3)SiO_{3/2})_1$    compound (B)

$R^a=-C_3H_6O(C_2H_4O)_{12.5}H$

When the compound (B) was analyzed by GPC, the weight-average molecular weight Mw was 24,700, and the dispersity (Mw/Mn) was 1.96.

Example 3

275 g of the organohydrogensiloxane represented by the average composition formula (5-2) synthesized in step (I) of Example 2, 183 g of a polyoxyalkylene compound of the following average composition formula (6-2), and 183 g of isopropyl alcohol were mixed in a reactor. 0.05 g of a 3 mass % solution of chloroplatinic acid in isopropyl alcohol was added to the obtained mixture, and this was made to react at 80° C. for 4 hours.

$CH_2=CHCH_2O(C_2H_4O)_{9.5}H$    Average composition formula (6-2)

After the completion of the reaction, the solvent was distilled off by heating the obtained solution under reduced pressure. Then, a compound of an organopolysiloxane (polyether-modified siloxane) (C) represented by the following average composition formula was obtained with a yield of 96%.

$((CH_3)_3SiO_{1/2})_3((CH_3)_2SiO_{2/2})_{109}((CH_3)R^bSiO_{2/2})_{9.9}((CH_3)HSiO_{2/2})_{0.1}((CH_3)SiO_{3/2})_1$    compound (C)

$R^b=-C_3H_6O(C_2H_4O)_{9.5}H$

When the compound (C) was analyzed by GPC, the weight-average molecular weight Mw was 24,800, and the dispersity (Mw/Mn) was 2.06.

Example 4

In step (I), an organohydrogensiloxane represented by the average composition formula (5-3) was synthesized with a yield of 87% in the same manner as Example 1 except that 478 g of an organosiloxane represented by the following average composition formula (2-2) was used instead of the compound (2-1), and that in addition, 2846 g of the compound (3-1), 340 g of the compound (3-2), and furthermore, 1178 g of the dimethylsiloxane represented by the average composition formula (4-1) were used.

Next, 180 g of the organohydrogensiloxane represented by the average composition formula (5-3) obtained in step (I), 145 g of the polyoxyalkylene compound of the average composition formula (6-1), and 145 g of isopropyl alcohol were mixed in a reactor. 0.05 g of a 3 mass % solution of chloroplatinic acid in isopropyl alcohol was added to the obtained mixture, and this was made to react at 80° C. for 4 hours.

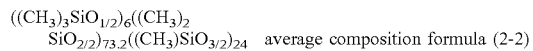

$((CH_3)_3SiO_{1/2})_6((CH_3)_2SiO_{2/2})_{73.2}((CH_3)SiO_{3/2})_{24}$ average composition formula (2-2)

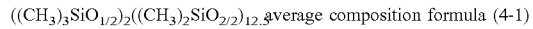

$((CH_3)_3SiO_{1/2})_2((CH_3)_2SiO_{2/2})_{12.9}$ average composition formula (4-1)

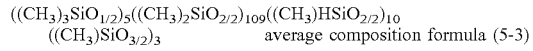

$((CH_3)_3SiO_{1/2})_5((CH_3)_2SiO_{2/2})_{109}((CH_3)HSiO_{2/2})_{10}((CH_3)SiO_{3/2})_3$ average composition formula (5-3)

After the completion of the reaction, the solvent was distilled off by heating the obtained solution under reduced pressure. Then, a compound of an organopolysiloxane (polyether-modified siloxane) (D) represented by the following average composition formula was obtained with a yield of 95%.

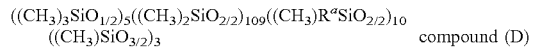

$((CH_3)_3SiO_{1/2})_5((CH_3)_2SiO_{2/2})_{109}((CH_3)R^aSiO_{2/2})_{10}((CH_3)SiO_{3/2})_3$ compound (D)

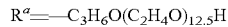

$R^a=\text{—}C_3H_6O(C_2H_4O)_{12.5}H$

When the compound (D) was analyzed by GPC, the weight-average molecular weight Mw was 27,100, and the dispersity (Mw/Mn) was 2.46.

Example 5

As a coating additive, 0.4 g of a 25% solution of the compound (A) obtained in Example 1 in propylene glycol monomethyl ether acetate was added to 20 g of a 60% solution of a hydroxy functional acrylic resin (manufactured by Allnex, MACRYNAL SM 510n/60LG), 10 g of propylene glycol monomethyl ether acetate, and 10 g of butyl acetate. After that, 4.0 g of aliphatic polyisocyanate (hexamethylene diisocyanate trimer) (manufactured by Covestro, DESMODUR N 3390 BA/SN) was further added as a curing agent, and the mixture was mixed by using a disperser until homogeneous. Thus, a coating composition was produced. After leaving to stand for 30 minutes, the obtained coating composition was applied onto glass by using an applicator so as to achieve a thickness of 30 μm. This was heat-cured at 80° C. for 40 minutes to form a coating layer (1). The obtained coating layer (1) was subjected to various evaluations according to the following.

Antifoaming property . . . the coating composition was uniformly mixed using a disperser, and after leaving to stand for 10 minutes, the state of the coating composition was observed.

Good: no foam.
Fair: some fine foam present.
Poor: a large amount of foam present.
Leveling property . . . the surface state of the coating layer on the glass was observed visually.
Good: a level surface state.
Fair: fine pockmarks present on some parts of the surface.
Poor: large pockmarks or waviness present on the surface.
Antifouling property . . . a line was drawn on the coating layer on the glass by using an oil-based pen, and evaluation was conducted on how easily the line disappeared when wiped with a tissue.
Good: the line disappeared easily.
Fair: the line disappeared when wiped repeatedly with force.
Poor: the line did not disappear.

Examples 6 to 8

Except that a 25% solution of the compound (B), (C), or (D) in propylene glycol monomethyl ether acetate was used instead of the 25% solution of the compound (A) in propylene glycol monomethyl ether acetate, coating layers (2), (3), and (4) were formed in the same manner as Example 5, and were evaluated regarding each property.

Comparative Example 1

Except that the 25% solution of the compound (A) in propylene glycol monomethyl ether acetate was not added, a coating layer (5) was formed in the same manner as Example 5, and was evaluated regarding each property.

Comparative Examples 2 and 3

Except that a 25% solution of a compound (E) or (F) of the following formulae in propylene glycol monomethyl ether acetate was used instead of the 25% solution of the compound (A) in propylene glycol monomethyl ether acetate, coating layers (6) and (7) were formed in the same manner as Example 5, and were evaluated regarding each property. Note that the dispersity (Mw/Mn) of the compounds (E) and (F) were respectively 1.56 and 1.59.

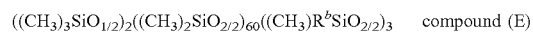

$((CH_3)_3SiO_{1/2})_2((CH_3)_2SiO_{2/2})_{60}((CH_3)R^bSiO_{2/2})_3$ compound (E)

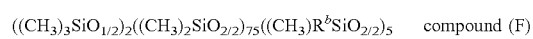

$((CH_3)_3SiO_{1/2})_2((CH_3)_2SiO_{2/2})_{75}((CH_3)R^bSiO_{2/2})_5$ compound (F)

$R^b=\text{—}C_3H_6O(C_2H_4O)_{9.5}H$

The results of Examples 5 to 8 and Comparative Examples 1 to 3 are shown in the following Table 1.

TABLE 1

|  |  | Antifoaming property | Leveling property | Antifouling property |
| --- | --- | --- | --- | --- |
| Example 5 | Coating layer (1) | Good | Good | Good |
| Example 6 | Coating layer (2) | Good | Good | Good |
| Example 7 | Coating layer (3) | Good | Good | Good |
| Example 8 | Coating layer (4) | Good | Good | Good |
| Comparative Example 1 | Coating layer (5) | Fair | Poor | Poor |
| Comparative Example 2 | Coating layer (6) | Good | Good | Poor |
| Comparative Example 3 | Coating layer (7) | Good | Good | Poor |

As shown in Table 1, it was revealed that the coating layers (1) to (4) formed from the coating compositions containing the inventive polyether-modified siloxane exhibited excellent antifouling property without losing antifoaming property or leveling property.

On the other hand, in Comparative Example 1, in which the coating composition containing no polyether-modified siloxane was used, excellent results were not achieved in any of antifoaming property, leveling property, or antifouling property. Meanwhile, in each of Comparative Examples 2 and 3, the coating layer was formed using the coating composition containing polyether-modified siloxane. However, in these polyether-modified siloxanes, the "c" in the average composition formula (1) was 0, and the polyether-modified siloxanes were linear, and therefore, different from the inventive polyether-modified siloxane. For this reason, it was not possible to achieve an excellent antifouling property in Comparative Examples 2 and 3.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A polyether-modified siloxane represented by an average composition formula (1):

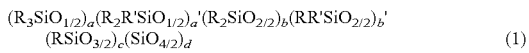  (1)

wherein in the formula (1), "R"s are each independent, are identical to or different from one another, and each represent a hydrogen atom, a hydroxy group, a monovalent hydrocarbon group having 1 to 18 carbon atoms, or an alkoxy group having 1 to 10 carbon atoms, "R'"s are each independent, are identical to or different from one another, and each represent an organic group selected from groups represented by $—C_qH_{2q}—O—(C_2H_4O)_e(C_3H_6O)_f—R^1$, $R^1$s are each independent, are identical to or different from one another, and each represent a hydrogen atom, a hydrocarbon group having 1 to 30 carbon atoms, or an organic group represented by $R^6—(CO)—$, $R^6$ represents a hydrocarbon group having 1 to 30 carbon atoms, "a", "a'", "b", "b'", "c", and "d" respectively satisfy $0 \le a \le 15$, $0 \le a' \le 15$, $5 \le b \le 1000$, $0 \le b' \le 50$, $1 \le c \le 10$, $0 \le d \le 5$, and $2 \le a'+b' \le 50$, "e" and "f" respectively satisfy $2 \le e \le 200$ and $0 \le f \le 200$, "q" satisfies $2 \le q \le 10$, and $2 \le e+f \le 200$.

2. The polyether-modified siloxane according to claim 1, wherein the "R"s in the formula (1) do not contain a methoxy group or an ethoxy group.

3. The polyether-modified siloxane according to claim 1, wherein d=0 in the formula (1).

4. The polyether-modified siloxane according to claim 2, wherein d=0 in the formula (1).

5. The polyether-modified siloxane according to claim 1, having a dispersity (Mw/Mn) of 1.70 to 2.70 in a gel permeation chromatography measurement in terms of polystyrene.

6. The polyether-modified siloxane according to claim 2, having a dispersity (Mw/Mn) of 1.70 to 2.70 in a gel permeation chromatography measurement in terms of polystyrene.

7. The polyether-modified siloxane according to claim 3, having a dispersity (Mw/Mn) of 1.70 to 2.70 in a gel permeation chromatography measurement in terms of polystyrene.

8. The polyether-modified siloxane according to claim 4, having a dispersity (Mw/Mn) of 1.70 to 2.70 in a gel permeation chromatography measurement in terms of polystyrene.

9. A coating additive comprising the polyether-modified siloxane according to claim 1.

10. A coating composition comprising the coating additive according to claim 9.

11. The coating composition according to claim 10, comprising a resin selected from the group consisting of urethane resin, acrylic resin, amide resin, phenolic resin, epoxy resin, melamine resin, urea resin, alkyd resin, polyimide resin, polyalkylene resin, polyvinyl chloride, polystyrene, polyvinyl acetate, and an alloy of the resins.

12. The coating composition according to claim 11, wherein the resin is urethane resin, acrylic resin, or epoxy resin.

13. The coating composition according to claim 10, being a coating composition for an antifouling coating.

14. The coating composition according to claim 11, being a coating composition for an antifouling coating.

15. The coating composition according to claim 12, being a coating composition for an antifouling coating.

16. A coating agent comprising the coating composition according to claim 10.

17. A coating layer formed from the coating agent according to claim 16.

18. A method for producing a polyether-modified siloxane represented by an average composition formula (1):

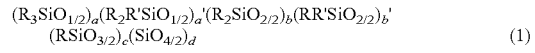  (1)

wherein in the formula (1), "R"s are each independent, are identical to or different from one another, and each represent a hydrogen atom, a hydroxy group, a monovalent hydrocarbon group having 1 to 18 carbon atoms, or an alkoxy group having 1 to 10 carbon atoms, "R'"s are each independent, are identical to or different from one another, and each represent an organic group selected from groups represented by $—C_qH_{2q}—O—(C_2H_4O)_e(C_3H_6O)_f—R^1$, $R^1$s are each independent, are identical to or different from one another, and each represent a hydrogen atom, a hydrocarbon group having 1 to 30 carbon atoms, or an organic group represented by $R^6—(CO)—$, $R^6$ represents a hydrocarbon group having 1 to 30 carbon atoms, "a", "a'", "b", "b'", "c", and "d" respectively satisfy $0 \le a \le 15$, $0 \le a' \le 15$, $5 \le b \le 1000$, $0 \le b' \le 50$, $1 \le c \le 10$, $0 \le d \le 5$, and $2 \le a'+b' \le 50$, "e" and "f" respectively satisfy $2 \le e \le 200$ and $0 \le f \le 200$, "q" satisfies $2 \le q \le 10$, and $2 \le e+f \le 200$, the method comprising the following steps (I) and (II), wherein step (I) is a step of using:

a compound represented by an average composition formula (2); and a compound represented by an average composition formula (3) and/or a compound represented by an average composition formula (4):

$(R''_3SiO_{1/2})_g(R''_2SiO_{2/2})_h(R''SiO_{3/2})_i(SiO_{4/2})_j$  (2)

wherein in the formula (2), "R''"s are each independent, are identical to or different from one another, and each represent a hydroxy group or a monovalent hydrocarbon group having 1 to 18 carbon atoms, $0 \le g \le 10$, $0 \le h \le 100$, $1 \le i \le 30$, and $0 \le j \le 8$;

$(R''_2SiO_{2/2})_k(R''HSiO_{2/2})_l$  (3);

$(R''_3SiO_{1/2})_m(R''_2HSiO_{1/2})_n(R''_2SiO_{2/2})_o(R''HSiO_{2/2})_p$  (4)

wherein in the formulae (3) and (4), "R'''"s are as described above, and $0 \leq k \leq 6$, $0 \leq l \leq 6$, $0 \leq m \leq 2$, $0 \leq n \leq 2$, $0 \leq o \leq 500$, $0 \leq p \leq 100$, $3 \leq k+l \leq 8$, $n+m=2$, and $0 \leq o+p \leq 500$;

to synthesize a compound represented by an average composition formula (5):

$$(R'''_3SiO_{1/2})_a(R'''_2HSiO_{1/2})_{a'}(R'''_2SiO_{2/2})_b(R'''HSiO_{2/2})_{b'}(R'''SiO_{3/2})_c(SiO_{4/2})_d \qquad (5)$$

wherein in the formula (5), "R'''", "a", "a'", "b", "b'", "c", and "d" are as described above, and step (II) is a step of causing a reaction between the compound of the formula (5) and a compound represented by an average composition formula (6):

$$CH_2=CX-C_rH_{2r}-O-(C_2H_4O)_e(C_3H_6O)_f-R^1 \qquad (6)$$

wherein in the formula (6), $R^1$, "e", and "f" are as described above, X represents a hydrogen atom or a monovalent hydrocarbon group having 1 to 5 carbon atoms, and $0 \leq r \leq 8$.

19. The method for producing a polyether-modified siloxane according to claim 18, wherein in the step (II), a ratio of the compound represented by the formula (6) to the compound represented by the formula (5), the ratio being [number of moles of alkenyl groups in a component of the formula (6)]/[number of moles of Si—H groups in a component of the formula (5)], is 1.00 to 2.00.

* * * * *